United States Patent
Gonzalez et al.

(10) Patent No.: US 10,829,200 B2
(45) Date of Patent: Nov. 10, 2020

(54) MULTIROTOR AIRCRAFT WITH COLLECTIVE FOR AUTOROTATION

(71) Applicant: Bell Helicopter Textron Inc., Fort Worth, TX (US)

(72) Inventors: Eric R. Gonzalez, Fort Worth, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 415 days.

(21) Appl. No.: 15/807,843

(22) Filed: Nov. 9, 2017

(65) Prior Publication Data
US 2019/0135411 A1 May 9, 2019

(51) Int. Cl.
*B64C 11/30* (2006.01)
*B64D 45/00* (2006.01)
*B64C 27/54* (2006.01)
*B64C 27/28* (2006.01)
*B64C 29/00* (2006.01)

(52) U.S. Cl.
CPC .............. *B64C 11/30* (2013.01); *B64C 27/28* (2013.01); *B64C 27/54* (2013.01); *B64C 29/0033* (2013.01); *B64D 45/00* (2013.01)

(58) Field of Classification Search
CPC ......... B64C 11/30; B64C 27/28; B64C 27/54; B64C 29/0033; B64D 45/00
USPC .................................. 244/12.4, 17.11, 17.13
See application file for complete search history.

(56) References Cited

U.S. PATENT DOCUMENTS

| | | | |
|---|---|---|---|
| 6,467,726 B1 | 10/2002 | Hosoda | |
| 8,616,492 B2 | 12/2013 | Oliver | |
| 2012/0261523 A1 | 10/2012 | Shaw | |
| 2016/0059958 A1* | 3/2016 | Kvitnevskiy | B64C 27/52 |
| | | | 701/3 |

FOREIGN PATENT DOCUMENTS

| | | | |
|---|---|---|---|
| EP | 2990332 A1 | 2/2016 | |
| WO | WO -2013098736 A2 * | 7/2013 | B64C 27/08 |

OTHER PUBLICATIONS

European Patent Office, "European Search Report," Application No. 18177421.7, dated Nov. 16, 2018, 4 pages.
European Patent Office, "Communication pursuant to Article 94(3) EPC," EPO Application No. 18177421.7, dated Nov. 28, 2018, 5 pages.

* cited by examiner

*Primary Examiner* — Christopher P Ellis
(74) *Attorney, Agent, or Firm* — Fogarty LLP

(57) ABSTRACT

A multirotor aircraft comprises at least three proprotors. Each proprotor has a plurality of rotor blades pivotably attached to a mast assembly. When a rotor blade pitch angle is changed for a proprotor, all rotor blades on the proprotor change to a same pitch angle. The proprotors are configured to spin freely when a power source is disengaged or fails. In various embodiments, one or more engines provides power to each proprotor, or at least one engine provides power to two or more proprotors. A rotor blade control system is configured to control a collective rotor blade pitch angle on each proprotor independently of the rotor blade pitch on the other proprotors. The rotor blade control system is configured to set a negative collective rotor blade pitch angle on an unpowered proprotor, such as in response to manual inputs by a pilot or in response to current engine conditions.

16 Claims, 3 Drawing Sheets

MULTIROTOR AIRCRAFT WITH COLLECTIVE FOR AUTOROTATION

TECHNICAL FIELD

The system of the present application relates in general to the field of flight control for aircraft. In particular, the system relates to apparatus and methods for autorotation of a multirotor aircraft in the event of failure of one or more engine.

BACKGROUND

Multirotor aircraft with three or more proprotors typically use fixed-pitch rotor blades. The angle of attack on these fixed-pitch rotor blades cannot be adjusted. This limits the aircraft's maneuverability due to the rotational inertia of the engines and proprotors. The use of fixed-pitch rotor blades also prevents the aircraft from autorotating in case of an engine failure.

SUMMARY

In an embodiment, a multirotor aircraft comprises at least three proprotors. Each proprotor having a plurality of rotor blades pivotably attached to a mast assembly. When a rotor blade pitch angle is changed for a proprotor, all rotor blades on the proprotor change to a same pitch angle. The multirotor aircraft further comprises a rotor blade control system configured to control a collective rotor blade pitch angle on each proprotor independently of the rotor blade pitch on the other proprotors. The proprotor is driven by an engine. In some embodiments, such as when an engine drive train locks or has friction upon failure, then the proprotor can have a freewheeling unit to allow rotation without engine power. In other embodiments, such as for electric motors wherein failures often originate in wiring, the motor is still free to rotate upon failure and a freewheeling unit is not needed. If a freewheeling unit is needed, then it is configured to allow the proprotor to spin freely when disengaged from a power source. The multirotor aircraft may further comprise a plurality of engines, each engine providing power to one proprotor, or at least one engine providing power to two or more proprotors.

In another embodiment, a multirotor aircraft comprises four proprotors, each proprotor having a plurality of rotor blades pivotably attached to a mast assembly. Each of the rotor blades on a proprotor move collectively to maintain the same pitch angle independently of a rotor blade pitch angle on the other proprotors. The multirotor aircraft further comprises a rotor blade control system configured to control rotor blade pitch angles on each proprotor. A freewheeling unit for each proprotor is configured to allow the proprotor to spin freely when disengaged from a power source. The rotor blade control system is configured to set a negative collective rotor blade pitch angle on a freewheeling proprotor independently of the rotor blade pitch on proprotors that are not freewheeling. The collective rotor blade pitch angle set on two or more proprotors can be different. The rotor blade control system is configured to control a flight path of the multirotor aircraft by setting a collective rotor blade pitch angle on each proprotor independently of the rotor blade pitch on other proprotors.

BRIEF DESCRIPTION OF THE DRAWINGS

Figure 1:
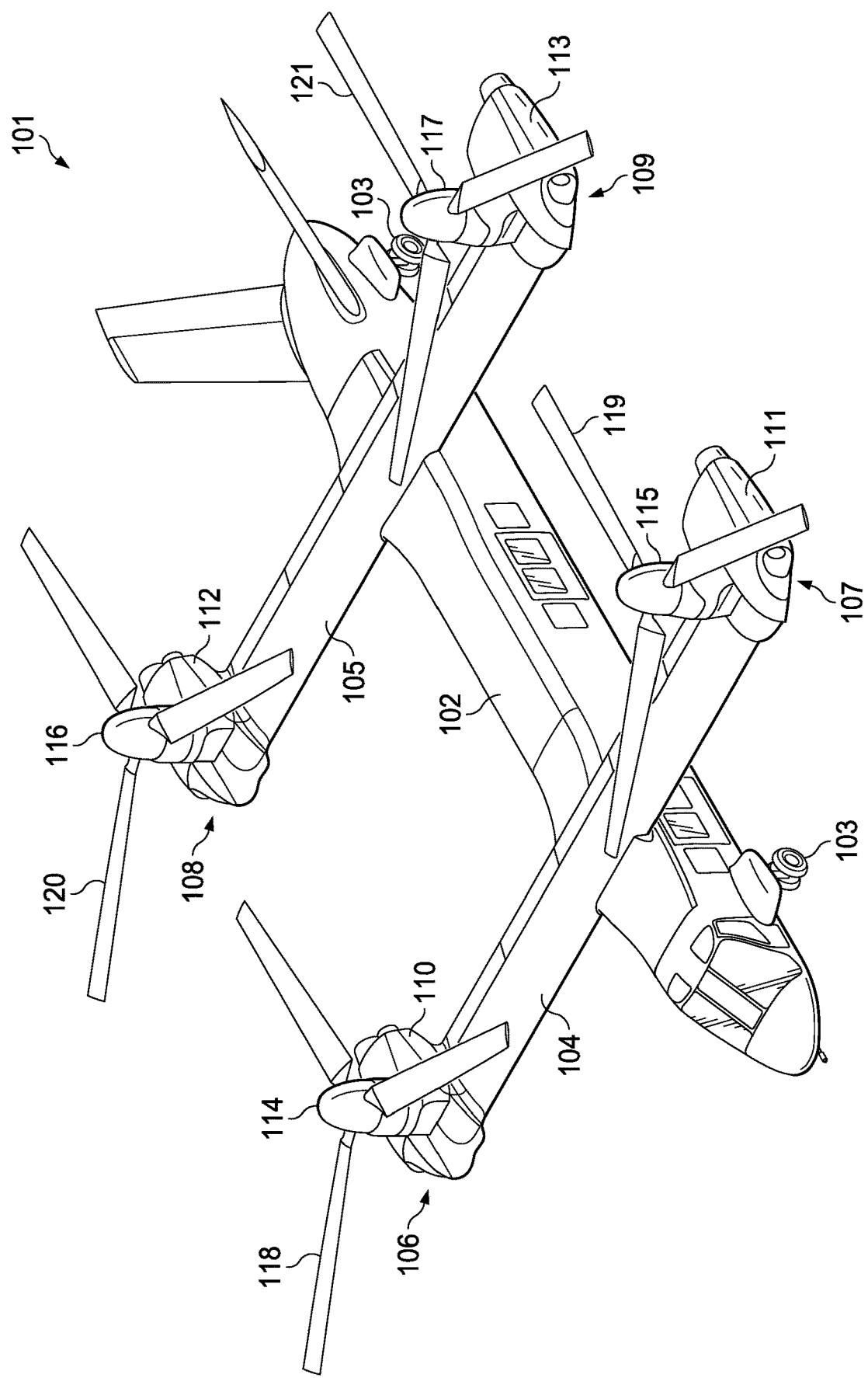

Having thus described the invention in general terms, reference will now be made to the accompanying drawings, which are not necessarily drawn to scale, and wherein:

FIG. 1 illustrates a multirotor aircraft in a helicopter mode wherein the proprotors are positioned substantially vertical to provide a lifting thrust.

Figure 2:
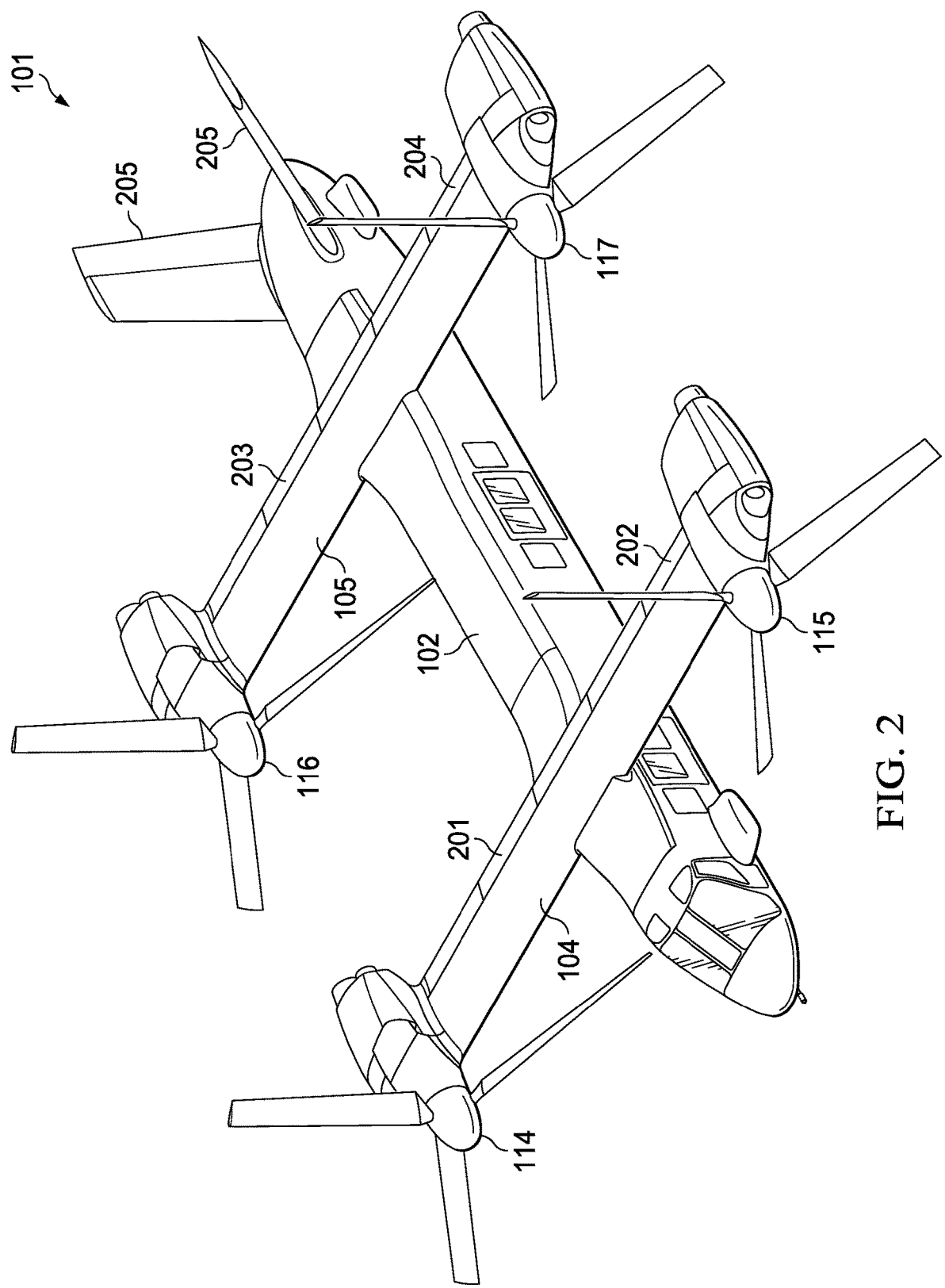

FIG. 2 illustrates a multirotor aircraft in an airplane mode wherein the proprotors are positioned substantially horizontal to provide a forward thrust.

Figure 3:
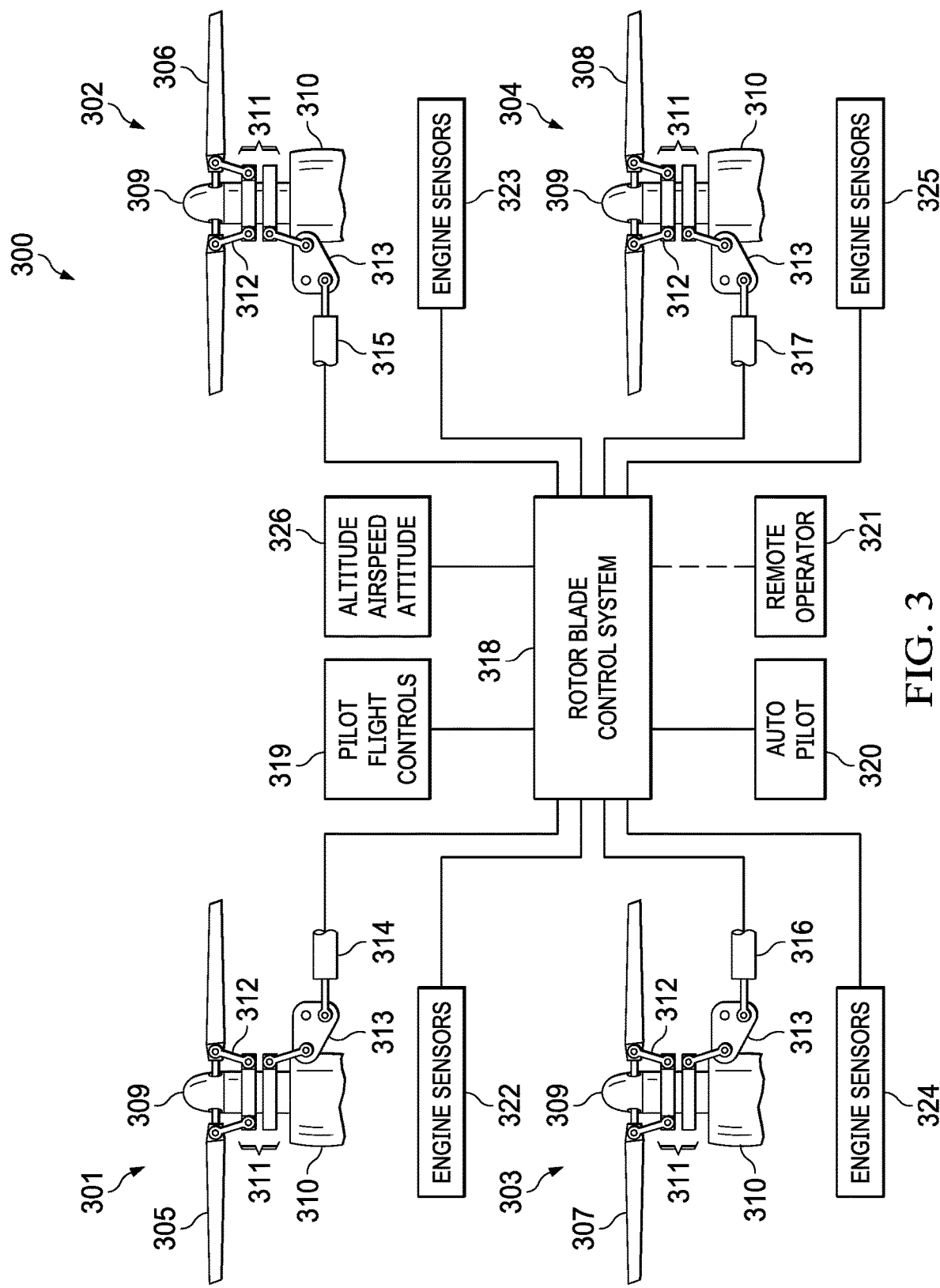

FIG. 3 is a diagram illustrating a system for controlling the pitch of rotor blades in a multirotor aircraft.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates a multirotor aircraft 101. Multirotor aircraft 101 may include fuselage 102, landing gear 103, and wings 104 and 105. A propulsion system 106-109 is positioned on the ends of wings 104 and 105. Each propulsion system 106-109 includes an engine 110-113 and a proprotor 114-117, respectively. Each proprotor 114-117 has a plurality of rotor blades 118-121, respectively, associated therewith. During operation, engines 110-113 typically maintain a constant rotational speed for their respective proprotors 114-117. The rotational direction (i.e., clockwise, or counterclockwise) of each proprotor 114-117 may be selected to counteract torque and P-factor. For example, proprotors on the same wing 104, 105 or on the same side of aircraft 101 may rotate in opposite directions. In one embodiment, proprotors 114 and 117 rotate in a counterclockwise direction and proprotors 115 and 116 rotate in a clockwise direction.

The pitch of rotor blades 118-121 can be adjusted to selectively control thrust and lift of each propulsion system 106-109 on multirotor aircraft 101. A collective pitch control allows a pilot, operator, or autopilot to adjust the pitch angle of all the rotor blades on one propulsion system at the same time (i.e., collectively). When a collective input is made to a propulsion system 106-109, all the respective rotor blades 118-121 for that propulsion system change pitch angle equally. As a result, the total lift for the adjusted prop rotor increases or decreases depending upon the amount and direction of the pitch angle change. The collective control may be applied equally or differentially to each propulsion system 106-109 to control the speed and direction of the movement of multirotor aircraft 101.

In a hover or level flight, equal pitch adjustments to each set of rotor blades 118-121 would cause multirotor aircraft 101 to climb or descend. Applying differential pitch adjustments to pairs of rotor blades would cause multirotor aircraft 101 to pitch up or down or to roll to one side. For example, increasing the pitch of rotor blades 118 and 119 relative to rotor blades 120 and 121 would cause multirotor aircraft 101 to pitch nose up, while decreasing the pitch of rotor blades 118 and 119 relative to rotor blades 120 and 121 would cause multirotor aircraft 101 to pitch nose down. Similarly, increasing the pitch of rotor blades 118 and 120 relative to rotor blades 119 and 121 would cause multirotor aircraft 101 would roll left, while increasing the pitch of rotor blades 119 and 121 relative to rotor blades 118 and 120 would cause multirotor aircraft 101 to roll left.

After pitching or rolling multirotor aircraft 101, other collective inputs can be applied to put the aircraft in motion. For example, once multirotor aircraft 101 is pitched forward an increase in total lift (i.e., equal collective input to all rotor blades 118-121) would produce an acceleration in the direction of pitch. Yaw on multirotor aircraft 101 can be controlled by applying more lift or thrust to pairs of rotor blades moving in the same direction. For example, increasing the pitch of rotor blades 118 and 121, which move counterclockwise, will result in multirotor aircraft 101 yawing in a clockwise direction. Counterclockwise yaw can be achieved by increasing the pitch of rotor blades 119 and 120.

The ability to control the movement of multirotor aircraft 101 using only collective control inputs as discussed above means that a cyclic control is not also required on each proprotor 114-117. This simplifies the swashplate design because cyclic blade control equipment is not required, which simplifies the design of propulsion systems 106-109. As a result, the propulsion systems 106-109 can be substantially less complex and less fragile than a conventional helicopter. Additionally, overall aircraft weight can be reduced by eliminating the cyclic controls and associated actuators.

Although multirotor aircraft 101 is shown in FIG. 1 as having separate engines for each propulsion system 106-109, it will be understood that in other embodiments a single engine may drive two or more proprotors 114-117. For example, an engine (not shown) located in fuselage 102 may drive two or more proprotors 114-117 through a central gearbox and connecting driveshafts. Similarly, one engine in a propulsion system 106-109 may drive its own proprotor plus one or more other proprotors 114-117 through a cross-drive shaft, such as to transfer power in the case of an engine failure.

It will be further understood that FIG. 1 is just one example of a multirotor aircraft design and that in other designs wings 104 and 105 are not required if the aircraft operates only in a helicopter mode. In other configurations, propulsion systems 106-109 may be part of fuselage 102 or attached to fuselage 102 by spars, struts, or other structures. Moreover, although four proprotors are illustrated in the system of FIG. 1, it will be understood that multirotor aircraft designs using the improvements disclosed herein may include three or more proprotors in any appropriate configuration.

FIG. 1 illustrates multirotor aircraft 101 in a helicopter mode wherein proprotors 114-117 are positioned substantially vertical to provide a lifting thrust. FIG. 2 illustrates multirotor aircraft 101 in an airplane mode wherein proprotors 114-117 are positioned substantially horizontal to provide a forward thrust. In the airplane mode of FIG. 2, lifting force is supplied by wings 104 and 105. Control surfaces 201-202 on wing 104 and/or control surfaces on wing 105 are used to adjust the attitude of multirotor aircraft 101 around the pitch, roll, and yaw axes while in airplane mode. Additional stabilizers or control surfaces 205 may be required when multirotor aircraft 101 in an airplane mode. Control surfaces 201-205 may be, for example, ailerons, flaps, slats, spoilers, elevators, or rudders.

It will be understood that multirotor aircraft 101 may be operated such that proprotors 114-117 are selectively positioned between the airplane mode of FIG. 2 and the helicopter mode shown in FIG. 1, which is referred to as a conversion mode.

An aircraft during flight is susceptible to a variety of failure scenarios that can potentially be life threatening for the crew and passengers on board, as well as destructive to the aircraft itself. Examples of failure scenarios include: engine failure, control actuator failure, control surface damage from in-flight collision with an object, battle damage sustained to a military aircraft, sensor failure, etc. If a multi-engine fixed-wing aircraft loses an engine during flight, the aircraft can usually survive the incident by making a single-engine landing because the wing provides lift for a controlled emergency landing. For rotary-wing aircraft, if an engine fails, the rotor blades that are driven by the failed engine no longer provide lift. As a result, engine failure in a rotary-wing aircraft typically requires an autorotation landing.

In normal flight, a helicopter draws air into the proprotor system from above and exhausts it downward as lift and thrust are generated. During autorotation, air moves in the opposite direction—up and into the proprotor from below—as the helicopter descends. If required for the engine configuration, a freewheeling assembly or overrunning clutch in each propulsion system 106-109 allows the proprotor to continue rotating freely when an engine fails. To initiate autorotation, the pilot must immediate lower the collective pitch of the rotor blades in case of an engine failure. This reduces lift and drag and the helicopter begins an immediate descent, which produces an upward flow of air through the proprotor system. This upward flow of air through the rotor blades provides sufficient thrust to maintain proprotor rotational speed throughout the descent.

Variable-pitch actuators in the propulsion systems 106-109 allow the rotor blades 118-121 to change from full positive pitch to full negative pitch very quickly. This allows aircraft 101 to perform aggressive maneuvers due to the ability to make abrupt changes in the amount of thrust or to even create negative thrust. Autorotation is another advantage provided by collective pitch control, since the angle of attack of the rotor blades has to be modified to reach autorotative equilibrium during the glide.

In an aircraft having three or more rotor systems, a collective pitch lever is used for controlling the angle of attack of the rotor blades with respect to the aircraft's body. If an engine fails, the pilot, operator, or autopilot should lower the collective pitch (e.g., the collective control all the way down) to maintain proprotor RPM during the entry into autorotation mode. By immediately lowering the collective pitch, lift and drag are reduced and the aircraft begins an immediate descent, which produces an upward flow of air through the proprotor system. If aircraft attitude control is available, it is helpful to pitch up the nose of the aircraft (or the side heading in the direction of travel) to ensure up flowing air through the proprotor. This upward air flow provides thrust to maintain rotor rotational speed throughout the descent. As the air starts flowing up through the proprotor system, the RPM will start to increase. If the RPM gets too high, the pilot, operator, or autopilot can increase collective pitch to lower RPM. The kinetic energy stored in the rotating blades is used to decrease the rate of descent while landing by increasing the collective pitch, which changes that inertia load in the proprotor to thrust and cushions the landing.

As noted above, in some configurations, a single engine could be used to power multiple proprotors in a multirotor aircraft. In some situations, such as depending upon the aircraft load, a single engine may not provide enough power to maintain level flight. Autorotation adds a safety feature that allows the aircraft to have a parachute-like descent in the case of an engine failure.

During autorotation, the proprotor on the failed engine is moved to negative pitch at first using the collective. In order to maintain the aircraft's attitude and prevent pitching or rolling following an engine failure, the thrust generated by the functioning engines/proprotors can be reduced to balance the failed engine more closely. In one embodiment, for example, the collective for the failed engine is moved to a negative pitch position so that the respective proprotor is at zero to negative pitch at the three-quarter radius. This maintains the rotational inertia of the proprotor. As the aircraft descends, its potential energy is converted into rotational energy in the proprotor by the upward flowing air. As the aircraft settles, the rotor system is kept spinning. Then, right before the aircraft approaches the ground, the collective pitch of the rotor blades is increase and the rotational energy in the proprotor is converted into thrust to slow the descent. The design of the proprotor may be selected to optimize autorotation capabilities, such as using heavier rotor blades and/or tip weights to better store and maintain rotational energy.

In a standard helicopter with one proprotor, the pilot typically has a collective control lever that provides control of rotor blade pitch. In a multi-rotor aircraft with three or more proprotors, it would be difficult for the pilot to manage the collective pitch control individually for each set of rotor blades.

FIG. 3 is a highly simplified diagram illustrating a system 300 for controlling the pitch of rotor blades in a multirotor aircraft. Proprotor assemblies 301-304 each comprise a plurality of rotor blades 305-308, respectively. To simplify the description herein, the example in FIG. 3 shows a system with four proprotors having two rotor blades each. It will be understood that in other configurations, an aircraft employing collective for auto-rotation may have any combination of three or more proprotors. Each proprotor may have any number of rotor blades. Furthermore, the size and number of rotor blades on different proprotors on the same aircraft may vary in some designs. Each rotor blade 305-308 is pivotably attached to a rotor mast 309. A transmission gearbox 310 is coupled to an engine (not shown) for each proprotor assembly 301-304. The transmission gearbox 310 drives rotor mast 309 and causes rotor blades 305-308 to rotate when the engine is operating. The engine may be turbine- or piston-driven or may be an electric motor. If the engine fails or is not running, transmission gearbox 310 can act as a freewheeling assembly that allows proprotors 301-304 to rotate independently. In one embodiment, each proprotor assembly 301-304 has its own engine. In other embodiments, a single engine may drive two or more proprotor assemblies 301-304 through a central gearbox and connecting driveshafts (not shown). Proprotors 301 and 304 rotate in a clockwise direction and proprotors 302 and 303 rotate in a counter-clockwise direction in one embodiment.

Each proprotor assembly 301-304 includes a swashplate unit 311. Rotor blades 305-308 are coupled to swashplate unit 311 via a rotor blade linkage 312. Each swashplate unit 311 is also coupled by linkages to a collective lever 313. Each collective lever 313 is driven by an actuator 314-317, respectively. Movement of a collective lever 313 causes the respective swashplate unit 311 to move up or down. Movement of the swashplate unit 311 in turn causes the pitch the respective of rotor blades 305-308 to change. Typically, when swashplate unit 311 moves up, the collective pitch of the rotor blades increases. Positive pitch on rotor blades 305-308 generates lift and thrust when the proprotors 301-304 are being rotated by the engine. When swashplate unit 311 moves down, the collective pitch of the rotor blades decreases. A decrease in positive pitch or movement to negative pitch on rotor blades 306-308 causes a decrease in the lift and thrust being generated by the proprotors 301-304.

Collective pitch actuators 314-317 may be mechanical, electrical, or hydraulic assemblies or a combination of such technologies. Collective pitch actuators 314-317 can be mechanically, electrically, or hydraulically controlled by a rotor blade control system 318. In one embodiment, a pilot flies a multirotor aircraft and provides inputs for controlling the pitch of rotor blades 305-308 using flight controls 319. Any appropriate combination of physical flight controls 319, such as a control stick, cyclic control, collective pitch lever, thrust control lever, directional pedals, and/or throttles, may be used by the pilot to provide inputs to rotor blade control system 318. Rotor blade control system 318 can accept inputs from more than one set of flight controls, such as from both a pilot and copilot position in the aircraft. Pilot flight controls 319 may provide a direct or remote connection to rotor blade control system 318 using, for example, mechanical, electrical, and/or hydraulic signals. In another embodiment, an autopilot system 320 may provide inputs to rotor blade control system 318 to maintain a predetermined flight profile set by a pilot or other operator. In some embodiments, the multirotor aircraft may be a remotely operated or drone aircraft. A remote operator 321 may provide inputs to inputs to rotor blade control system 318 from remote flight controls or a remote terminal via radio signals, for example.

Rotor blade control system 318 may be a processor-based system that executes computer instructions stored as software or firmware to perform flight control operations. Rotor blade control system 318 translates pilot or operator inputs, which indicate a desired change in aircraft attitude or movement, to the necessary rotor-blade positions to effect such change. For example, a flight control input indicating that the multirotor aircraft should ascend or descend may be translated by rotor blade control system 318 to equal pitch adjustments on each set of rotor blades 305-308. Flight control inputs indicating a change in aircraft pitch or roll may be translated by rotor blade control system 318 to differential pitch adjustments to pairs of rotor blades 305-

308. For example, if a control stick is moved to the right by the pilot, rotor blade control system 318 can increase the pitch of rotor blades 305 and 307 relative to rotor blades 306 and 308, which would cause multirotor aircraft to roll right in FIG. 3. If differential pedal inputs are applied by the pilot, then rotor blade control system 318 may translate those inputs to a yaw instruction, which can be accomplished by applying more lift or thrust to pairs of proprotors 301-304 that are moving in the same direction. For example, increasing the pitch of clockwise-moving proprotors 301 and 304 will cause the multirotor aircraft 101 to yaw in a counterclockwise direction.

Each propulsion system on the aircraft may have sensors 322-325 that are used to monitor operating conditions, such as RPM, temperature, fuel flow, and/or fire detection. Rotor blade control system 318 may receive engine sensor data for each propulsion system for use in determining how to control collective pitch actuators 314-317 and rotor blades 305-308. Additionally, rotor blade control system 318 may receive data from aircraft altitude, airspeed, and attitude sensors, such as an altimeter, pitot static system, gyroscope, inertial navigation system, and/or air data computer. Rotor blade control system 318 can use the data from engine sensors 322-325 and altitude, airspeed, and attitude sensors 326 to determine the required position of rotor-blades 305-308 to achieve the inputs directed by pilot flight controls 319, autopilot 320, or remote operator 321.

In the case of a multi-rotor aircraft, an engine failure can result in the loss of power to one or more proprotors. In some multi-rotor aircraft designs, the aircraft may still be flyable following loss of power to a single proprotor depending on the number of operating proprotors, the aircraft center of gravity, the aircraft loading, and other factors. In many cases engine failure in a multi-rotor aircraft is likely to create an emergency requiring that the aircraft land as soon as possible. In this case, the pilot should begin flying an autorotation profile, which involves immediately moving the rotor blades associated with the failed engine to a negative pitch angle and beginning a descent. The engine structure or a separate freewheeling unit will allow the proprotor that is normally driven by the failed engine to continue to rotate. During the descent, up-flowing air pushing on the negative-pitch rotor blades will keep the proprotor spinning.

For example, if the engine driving proprotor 301 fails, then actuator 314 can be activated by rotor blade control system 318 to drive rotor blades 305 to a negative pitch position. Rotor blade control system 318 may select this negative-pitch configuration in response to pilot inputs via pilot flight controls 319 or in response to inputs from autopilot 320 or remote operator 321. Alternatively, rotor blade control system 318 may automatically configure rotor blades 305 to the negative-pitch configuration based upon information from engine sensors 322 and/or altitude, airspeed, and attitude sensors 326.

To maintain a balanced flight condition, one or more other proprotors 302-304 on the multirotor aircraft may need to be put in a negative-pitch configuration corresponding to proprotor 301 even though those proprotors are still being driven by a working engine. Rotor blade control system 318 can select this negative-pitch configuration for proprotors 302-304 and rotor blades 306-308 in response to inputs from pilot flight controls 319, autopilot 320, or remote operator 321. Rotor blade control system 318 may automatically configure rotor blades 306-308 to the negative-pitch configuration in response to information from engine sensors 322 and/or altitude, airspeed, and attitude sensors 326 and the configuration required by proprotor 301.

In some configurations, one engine may drive two or more proprotors 301-304. As a consequence, failure of one engine may result in two or more proprotors 301-304 losing power. When two or more engines fail, rotor blade control system 318 can command a negative-pitch configuration for the affected proprotors and associated rotor blades. To maintain a balanced flight condition, proprotors that are still being driven by operating engines may need to be commanded to a negative-pitch configuration by rotor blade control system 318.

During an autorotation, zero forward airspeed will typically result in the highest rate of descent. However, the rate of descent can be controlled in some multirotor aircraft by increasing airspeed. The specific airspeed at which a power-off glide is most efficient will depend upon rotorcraft design. The optimal airspeed for autorotation combines the greatest glide range with the slowest rate of descent. A multirotor aircraft having collectively controlled rotor blades as described herein can control the direction of flight during an autorotation by adjusting the degree of rotor pitch on each proprotor. For proprotors that are not being driven by an engine, rotor pitch can be varied as long as the pitch angle remains negative, which will allow upward flowing air to drive the proprotor. For proprotors that are still operationally coupled to a working engine during autorotation, the rotor blade pitch angle may be varied across negative, neutral, and positive angles. By applying different degrees of collective pitch to different proprotors during autorotation, the flight path of the multirotor aircraft can be controlled, which improves the overall safety of the aircraft.

During autorotation, as the multirotor aircraft nears the ground, the pilot, autopilot, or other operator can flare the aircraft to slow, but not stop, the rate of descent by applying differential collective inputs to the proprotors. The collective pitch on all proprotors can then be increased to cushion the landing of the multirotor aircraft.

In an example embodiment, a multirotor aircraft comprises three or more proprotors. The number of proprotors may vary based upon aircraft design factors. Each proprotor has a plurality of rotor blades that are pivotably attached to a mast assembly. The rotor blade pitch is adjustable through a range of positive and negative angles relative to a direction of blade rotation. Positive pitch angles are generally associated with air flowing from above the proprotor in a downward direction, while negative pitch angles are generally associated with air flowing from below the proprotor in an upward direction. When a rotor blade pitch angle is changed on a proprotor, all rotor blades on that proprotor change to the same pitch angle (i.e., the rotor blades move collectively but not cyclically on each proprotor).

The multirotor aircraft further comprises a plurality of engines in some embodiments, wherein one or more engines provide power to each proprotor. In other embodiments, the multirotor aircraft comprises at least one engine that provides power to two or more proprotors. The proprotors are configured to spin freely when disengaged from an engine or other power source or when the engine or power source fails.

A rotor blade control system is configured to control the collective rotor blade pitch angle on each proprotor independently of the rotor blade pitch that is set on the other proprotors. The rotor blade control system can be configured to set a negative collective rotor blade pitch angle on an unpowered proprotor independently of the rotor blade pitch on powered proprotors. For example, when an engine fails the rotor blades on the proprotors driven by the failed engine are set to negative pitch angle. This negative pitch angle configuration helps to keep the proprotors spinning in a descent, such as during an autorotation. The rotor blade control system can be configured to set rotor blade pitch angles in response to manual inputs by a pilot, such as in response to certain flight control inputs or configurations. The rotor blade control system can also be configured to automatically set rotor blade pitch angles in response to current engine conditions, such as when an engine failure is detected.

The rotor blade control system can be configured to set a negative collective rotor blade pitch angle on all proprotors when one or more power sources fail so that both powered and unpowered proprotors have a negative pitch. The negative collective rotor blade pitch angle may be set on all proprotors during autorotation of the multirotor aircraft, for example.

The rotor blade control system can be configured to control a flight path of the multirotor aircraft by setting a collective rotor blade pitch angle on each proprotor independently of the rotor blade pitch on other proprotors. For example, the rotor blade control system can be configured to control an attitude of the multirotor aircraft by setting a collective rotor blade pitch angle on each proprotor independently of the rotor blade pitch on other proprotors. Differential rotor blade pitch angle will generate differential lift or drag among the proprotors, which can be controlled to effect changes in pitch, roll, and/or yaw.

A multirotor aircraft in another embodiment has a plurality of proprotors, wherein each proprotor has a plurality of rotor blades pivotably attached to a mast assembly. The rotor blades on each proprotor move collectively to maintain the same pitch angle independently of a rotor blade pitch angle on the other proprotors. A rotor blade control system is configured to control rotor blade pitch angles on each proprotor. When one or more engines fail, the rotor blade control system sets a negative collective rotor blade pitch angle on unpowered proprotors independently of the rotor blade pitch on powered proprotors. The rotor blade pitch angle of powered proprotors may be a positive or a negative angle. In some embodiments, the rotor blade control system sets a negative collective rotor blade pitch angle on all proprotors when one or more power sources fail.

The collective rotor blade pitch angle set on a first set of one or more proprotors may be different than the collective rotor blade pitch angle set on a second set of one or more proprotors. The rotor blade control system can be configured to control a flight path of the multirotor aircraft, for example, by setting a collective rotor blade pitch angle on each proprotor or set of proprotors independently of the rotor blade pitch on other proprotors or sets of proprotors.

In a manned aircraft, the rotor blade control system can be configured to respond to a pilot's flight control inputs to control the rotor blade pitch angles on each proprotor. When a power failure is detected for one or more proprotor, which may be indicated by an engine sensor or a pilot input, for example, the rotor blade control system can set a negative collective rotor blade pitch angle on all unpowered proprotors and reduce the collective rotor blade pitch angle on all powered proprotors to maintain controlled flight. This puts the aircraft in a configuration to autorotate if insufficient power is available to maintain level flight. It also prevents unexpected pitch, roll, and/or yaw inputs that would result from unbalanced proprotor thrust.

In an unmanned aircraft, such as a remotely controlled drone aircraft or an aircraft running on an autopilot, a rotor blade control system can automatically control rotor blade pitch angles on each proprotor in response to the autopilot or remote operator flight control inputs. When a power failure is detected for one or more proprotor, the rotor blade control system can be configured to set a negative collective rotor blade pitch angle on all proprotors and to initiate an autorotation flight profile.

The rotor blade control system may be controlled by automatic flight software for both manned aircraft and unmanned aircraft. The decision logic that controls the degree of negative pitch angle that is set on unpowered proprotors and the pitch angle set on powered proprotors may be dependent, for example, upon whether the aircraft is manned or unmanned and whether the aircraft is able to maintain level flight.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:
1. A multirotor aircraft, comprising:
   at least three proprotors, each proprotor having a plurality of rotor blades pivotably attached to a mast assembly, wherein all of the rotor blades on each proprotor are attached to the mast assembly in a single plane;
   a rotor blade control system configured to set a negative collective rotor blade pitch angle on an unpowered proprotor independently of the rotor blade pitch on powered proprotors, the rotor blade control system configured to control a collective rotor blade pitch angle on each proprotor independently of the rotor blade pitch on the other proprotors;
   wherein when a rotor blade pitch angle is changed for one of the at least three proprotors, all rotor blades on the proprotor change to a same pitch angle such that cyclic blade control cannot be applied to the proprotor; and
   wherein the proprotor is configured to spin freely when disengaged from a power source or when the power source fails.

2. The multirotor aircraft of claim 1, further comprising:
   a plurality of engines, wherein one or more engines provides power to each proprotor.

3. The multirotor aircraft of claim 1, further comprising:
   at least one engine providing power to two or more proprotors.

4. The multirotor aircraft of claim 1, wherein the rotor blade control system is configured to set rotor blade pitch angles in response to manual inputs by a pilot.

5. The multirotor aircraft of claim 1, wherein the rotor blade control system is configured to automatically set rotor blade pitch angles in response to current engine conditions.

6. The multirotor aircraft of claim 1, further comprising:
a rotor blade control system configured to set a negative collective rotor blade pitch angle on all proprotors when one or more power sources fail.

7. The multirotor aircraft of claim 1, further comprising:
a rotor blade control system configured to set a negative collective rotor blade pitch angle on all proprotors during autorotation of the multirotor aircraft.

8. The multirotor aircraft of claim 1, further comprising:
a rotor blade control system configured to control a flight path of the multirotor aircraft by setting a collective rotor blade pitch angle on each proprotor independently of the rotor blade pitch on other proprotors.

9. The multirotor aircraft of claim 1, further comprising:
a rotor blade control system configured to control an attitude of the multirotor aircraft by setting a collective rotor blade pitch angle on each proprotor independently of the rotor blade pitch on other proprotors.

10. A multirotor aircraft, comprising:
four proprotors, each proprotor having a plurality of rotor blades pivotably attached to a mast assembly, wherein all of the rotor blades on each proprotor are attached to the mast assembly in a single plane, wherein each of the rotor blades on a proprotor move collectively to maintain the same pitch angle independently of a rotor blade pitch angle on the other proprotors; and
a rotor blade control system configured to set a negative collective rotor blade pitch angle on an unpowered proprotor independently of the rotor blade pitch on powered proprotors, the rotor blade control system configured to control a collective rotor blade pitch angle on each proprotor independently of the rotor blade pitch on the other proprotors;
wherein when a rotor blade pitch angle is changed for one of the four proprotors, all rotor blades on the proprotor change to a same pitch angle such that cyclic blade control cannot be applied to the proprotor.

11. The multirotor aircraft of claim 10, wherein a rotor blade pitch angle of powered proprotors is a positive angle.

12. The multirotor aircraft of claim 10, wherein a rotor blade control system sets a negative collective rotor blade pitch angle on all proprotors when one or more power sources fail.

13. The multirotor aircraft of claim 12, wherein the collective rotor blade pitch angle set on a first set of one or more proprotors is different than the collective rotor blade pitch angle set on a second set of one or more proprotors.

14. The multirotor aircraft of claim 10, wherein a rotor blade control system is configured to control a flight path of the multirotor aircraft by setting a collective rotor blade pitch angle on each proprotor independently of the rotor blade pitch on other proprotors.

15. The multirotor aircraft of claim 10, further comprising:
a rotor blade control system configured to automatically control rotor blade pitch angles on each proprotor in response to a pilot's flight control inputs,
wherein, when a power failure is detected for one or more proprotor, the rotor blade control system is configured to:
set a negative collective rotor blade pitch angle on all unpowered proprotors; and
reduce the collective rotor blade pitch angle on all powered proprotors to maintain controlled flight.

16. The multirotor aircraft of claim 10, further comprising:
a rotor blade control system configured to automatically control rotor blade pitch angles on each proprotor in response to autopilot or remote operator flight control inputs,
wherein, when a power failure is detected for one or more proprotor, the rotor blade control system is configured to:
set a negative collective rotor blade pitch angle on all proprotors; and
initiate an autorotation flight profile.

* * * * *